United States Patent [19]

Venables, III

[11] Patent Number: 4,532,788
[45] Date of Patent: Aug. 6, 1985

[54] APPARATUS FOR MAKING SPINE FIN STOCK

[75] Inventor: Herbert J. Venables, III, Hunting Valley Village, Ohio

[73] Assignee: The Venables Machine and Tool Company, Cleveland, Ohio

[21] Appl. No.: 497,574

[22] Filed: May 24, 1983

Related U.S. Application Data

[63] Continuation-in-part of Ser. No. 392,575, Jun. 28, 1982, abandoned.

[51] Int. Cl.³ .............................................. B21D 53/04
[52] U.S. Cl. ....................................... 72/186; 72/195; 72/249
[58] Field of Search ................. 72/248, 249, 186, 195; 29/157.3 AH

[56] References Cited

U.S. PATENT DOCUMENTS 2,250,593  7/1941  Mesnel .................................... 72/186
2,596,997  5/1952  Harter ..................................... 72/186
4,112,722  9/1978  Boucard .................................. 72/249

Primary Examiner—Lowell A. Larson
Attorney, Agent, or Firm—Pearne, Gordon, Sessions, McCoy, Granger & Tilberry

[57] ABSTRACT

Apparatus for producing spine fin material of the type employing counter-rotating toothed cutter rolls to transversely slit ribbon stock. The apparatus includes a positive gear drive for controlling the angular cutter roll postions and a support arrangement permitting center-to-center adjustment of the cutter rolls independently of the center-to-center relation of associated gear drive elements.

17 Claims, 6 Drawing Figures

APPARATUS FOR MAKING SPINE FIN STOCK

This application is a continuation-in-part of my pending application Ser. No. 392,575 (now abandoned) filed June 28, 1982.

BACKGROUND OF THE INVENTION

The invention relates generally to the manufacture of spine fin stock for heat exchanger tubing, and more particularly to a novel and improved apparatus for manufacturing such product.

PRIOR ART

In my prior U.S. Pat. Nos. 3,005,253, dated Oct. 24, 1961; 3,134,166, dated May 26, 1964; 3,688,375, dated Sept. 5, 1972; and 3,820,217, dated June 20, 1974, I disclose a heat exchanger tube structure in which spine fin stock is helically wound around a base tube to provide a lightweight, highly efficient heat exchanger structure and machines for forming such structure.

As disclosed in these patents, a metal strip is transversely slit from at least one longitudinal edge at uniformly spaced locations along its length to provide successive fins having a face width corresponding to the spacing of the slits. Apparatus for slitting the strip or ribbon includes a pair of cutter rolls having mutually intermeshed or overlapped cutting teeth with a circumferential spacing on each roll corresponding to the longitudinal spacing of the slits. As the strip passes through the nip of the cutter rolls, opposed edges of the cutter teeth slit the ribbon stock. In my earlier aforementioned patents, one of the cutter rolls is power driven in rotation, while the other is rotated by contact with the stock being processed or by tooth contact with the power driven cutter roll in the manner of an idler wheel.

Cutter sets employing one drive roll and one driven roll encounter rapid wear when they are run without cutting stock, since the cutting edges of the intermeshed teeth engage the associated teeth on the other roll under such conditions. Consequently, it has been necessary in the past to form the teeth with a relatively broad end face and to position the cutter rolls so that they overlap or intermesh a substantial amount. These broad end faces and substantial overlap permit the cutters to be used even after substantial wear in the tooth profile has occurred. Cutter roll sets employing only one driven roll do not encounter appreciable wear when cutting a strip because such strip maintains a spacing between opposite teeth on the tool rolls. However, such spacing varies with the physical properties of the strip being cut, with the result that the slitting of the strip is not completely uniform. In some extreme instances when the strip is very soft, the strip is not cut, but merely corrugated. Further, it has been commercially impractical to use such cutter roll sets to slit spines having a very small face width in the longitudinal strip direction.

In practice, the minimum spine face width that has been practical to commercially cut with one driven cutter roll has been about 0.030 inch. Spines produced by single drive cutters have exhibited, in many instances, a substantial amount of edge distortion, which tends to inhibit flow of air over the spines in heat exchanger installations, and tends to reduce the heat exchange capacity of the spine fin tube. Further, in such spines, a substantial amount of working and tearing occur at the root end of the spine, which inhibits heat transfer between the tube and spines.

My later U.S. Pat. No. 3,820,217 discloses improved strip slitting apparatus wherein a pair of cooperating cutter rolls are positively driven by essentially zero clearance gearing for maintaining a fixed, positive angular relationship between the rolls and, consequently, a desired circumferential spacing between opposed cutting edges of cooperating cutting teeth. The gearing ensures that the cutting edges do not engage even when the cutter rolls are operated without a strip to be cut. This eliminates the rapid wear which otherwise tends to occur when the cutting edges of the teeth engage those of the opposed roll. As taught in this latter patent, the gearing is arranged to maintain a predetermined small circumferential space between the associated cutting edges when the strip material is being slit. Therefore, more uniform slitting operation is obtained in which the slitting is not materially affected by the physical properties of the strip being cut. The cutting teeth can be formed with narrow end faces and can be adjusted so that the overlap of the associated teeth is minimal. Consequently, narrower spines can be cleanly cut with little or no edge distortion. Further, the distortion occurring at the root of each spine is minimized so as to allow good heat transfer between the tube and each spine.

The U.S. Pat. No. 3,985,054 also discloses a gear driven cutter system. In such patent means are provided to torsionally load the drive gears to eliminate backlash.

SUMMARY OF THE INVENTION

The present invention provides a positive drive arrangement for a pair of intermeshed, toothed cutter rolls having means to adjustably determine both their angular relation and degree of overlap independently of like positional adjustments imposed on their respective drive elements. As a result, clearance, in the circumferential sense, between the tooth profiles, including negative clearance or preload, can be readily accomplished.

The disclosed apparatus achieves the benefits of positive cutter roll drive recognized in my aforementioned prior U.S. Pat. No. 3,820,217. As discussed above, these benefits include longer cutter life and greater product uniformity. Further reductions in the practical gauge of stock that can be successfully processed in apparatus disclosed hereinbelow is possible, since the position settings for both the cutter rolls and gear drive elements can be optimized for cutting light gauge stock or foil with thermally efficient, relatively small face width fins.

With the positions of the cutter rolls being independent of the positions of the drive elements, both sets of these components can be adjusted to their respective ideal settings. The cutter rolls are adjusted such that their teeth overlap and are gapped to suit the material being processed, and the gears of the drive set are adjusted to eliminate backlash. Manufacturing tolerances of the cutter and drive components are no longer directly interrelated, with the result that they are less expensive to produce. The cutter rolls can be resharpened at a fraction of their original manufacturing cost. With the disclosed apparatus, replacement with new or resharpened rolls can be accomplished without the necessity of disturbing the set-up of the drive gears. Where resharpening of the cutter rolls includes the step of grinding its outside diameter, adjustment of the center-to-center distance between cutter rolls to maintain a desired overlap or intermeshing is readily accomplished without affecting the set-up of the drive elements.

Another important aspect of the invention is that it can be embodied in a configuration that is practical for retrofitting existing machines, which at present incorporate sets of cutter rolls having only one driving roll.

There are several advantages derived from the use of relatively light-gauge foil made practical by the present invention. These include a reduction in material consumption and lighter weight in the final product. There is also associated with a reduction in the practical gauge of foil stock, made possible with the invention, increased machine productivity. This results from the effective increase in capacity of a given machine to hold the proportional increase in length of ribbon stock to be slit. Where the machine is effectively increased in its storage capacity, the machine can be run for longer periods between reloading. A reduction in downtime of 50% based on a prior experience of 20% of total machine time for loading to an expected 10% of such time may be anticipated.

DESCRIPTION OF THE PREFERRED EMBODIMENTS

The principles of the invention are applicable, for example, to machines of the general type described in my prior patents identified above. In particular, the apparatus disclosed herein, as will be understood by those skilled in the art, can be retrofitted or otherwise adapted to machines of the type illustrated in aforementioned U.S. Pat. No. 3,688,375, the disclosure of which is incorporated herein by reference.

Figure 4:
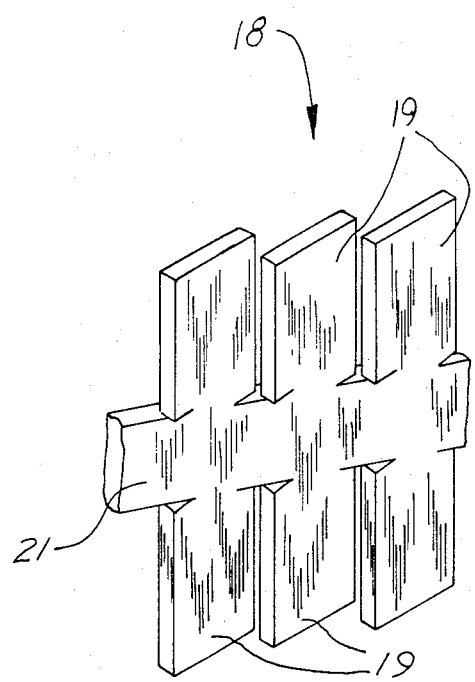
FIG. 4 is a fragmentary, perspective view of spines formed on a sheet metal foil strip or ribbon in accordance with the invention.

Apparatus 10 for lancing or slitting a continuous strip or ribbon of sheet stock foil includes two cutter rolls 11 and 12, which are journaled for counter-rotation about respective axes 13 and 14. Each of the rolls 11,12 is formed along its periphery with sawtooth-shaped cutter teeth 16, the teeth each being interrupted by a space 17 so as to define upper and lower teeth sections 16a, 16b, respectively. As discussed in greater detail below, the spacing of the axes 13,14 and the size of the rolls 11,12 are proportioned so that opposed cutter teeth 16 overlap and each tooth cooperates with an associated tooth on the opposed roll to cut or slit a strip 18 (FIG. 4) as it passes between the rolls. The rolls 11,12 are arranged to slit the strip 18 from both edges to form spines 19, which extend perpendicularly to the length of the strip from the edge thereof. Each spine 19 remains joined to an uncut central, longitudinally extending region 21.

As disclosed in my prior U.S. Pat. Nos. 3,688,375 and 3,160,129, rotation of the roll 11 relative to a winding head frame assembly 22 results from relative rotation between a torque tube 23 and a tube support 24 on which the winding head frame assembly 22 is carried.

The torque tube 23 has a precision-formed internal spine 26 which receives a complementary, closely fitting, external spine 27 on a lower end of a main shaft 28. The main shaft 28 is journaled for rotation about the axis 13 in separate, axially spaced, anti-friction precision ballbearing units 29,31. The shaft 28 is axially fixed with respect to the lower bearing unit 29 by a lock nut 38. The cutter roll 11 is generally annular in configuration, having a precision-formed, centrally located cylindrical bore 32 closely fitted to a cylindrical stub end 33 of the shaft 28. The angular position of the roll 11 on the shaft 28 is adjustable within limits of circumferentially spaced slots 34 through which threaded bolts 36 extend into aligned threaded holes in a flange 37 on the shaft 28 adjacent the stud end 33. When properly angularly oriented on the shaft 28, the bolts 36 are tightened to lock the roll 11 in place. Thus, it can be seen that the roll 11 rotates with the shaft 28 and torque tube 23. Integrally formed on the upper end of the torque tube 23 is a precision-formed spur gear 41.

The second cutter roll 12 is journaled for rotation about an axis parallel and closely associated with the axis 14 by a precision double-roll ball bearing unit 46 on a generally cylindrical pivot post 47. Like the first cutter roll, the second roll 12 is generally annular in shape, having a central, precisely formed, cylindrical bore closely fitting the outer race of the ball bearing unit 46. The bore of the inner race of the bearing unit 46 is closely fitted on a cylindrical stub portion 48 of the post 47. The cylindrical stub portion 48 is slightly eccentric, but parallel to the central axis 14 of the remainder of the post 47 for reasons explained below. The inner race of the ball bearing unit 46 is locked on the pivot post 47 by a lock nut 49. The pivot post 47 is supported on the frame assembly 22 by precision-formed bushings 51,52 which embrace the cylindrical exterior of the main length of the post. The pivot post 47 is provided with a central, cylindrical bore 53 in which are concentrically disposed a tension tube 54 and a torsion rod 56. The lower end of the tension tube 54 is welded to a washer-like plate 57 which, at the periphery of its upper face, abuts the lower bushing 51. At its upper end, the tension tube 54 is externally threaded and receives a lock nut 58 which bears against the upper end face of the pivot post 47.

Figure 3:
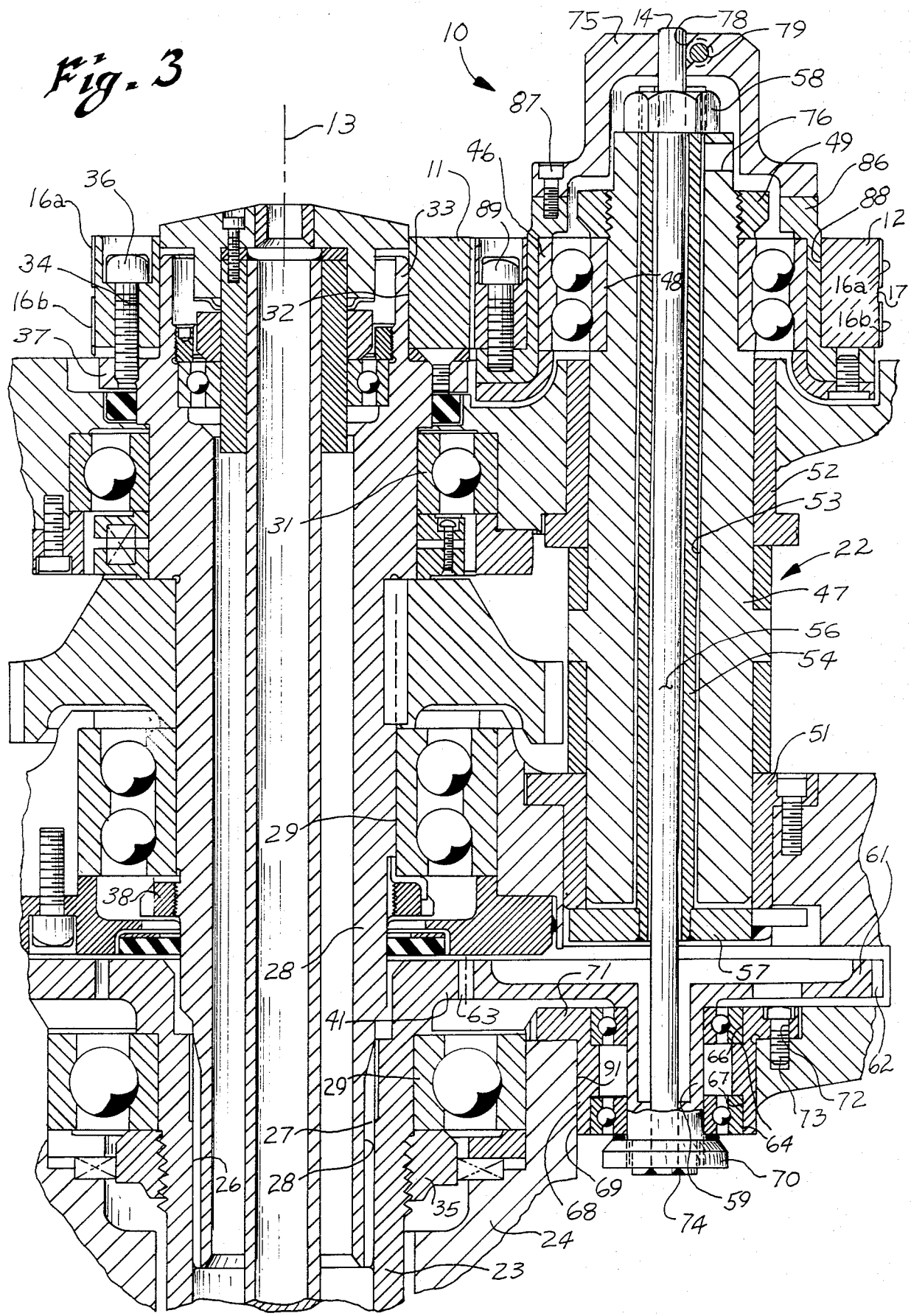
FIG. 3 is a fragmentary, cross-sectional view of apparatus, in more detail than FIG. 2, incorporating the cutter rolls and drive elements for transversely slitting sheet metal ribbon stock to form spine fins thereon and, ultimately, heat exchanger tubes wrapped with such fins.

As indicated in FIG. 3, the pivot post bore 53 provides radial clearance for the tension tube 54 and the interior of the tension tube 54 provides generous radial clearance for the torsion rod 56. The lower end of the torsion rod 56 passes axially through an extended hub 59 integrally formed on a spur gear 61. The spur gear 61 is provided with precision-formed, external teeth 62 meshed with complementary teeth 63 on the periphery of the main shaft gear 41. The extended gear hub 59 is rotatably supported in a pair of axially spaced, anti-friction, precision ball bearings 64. The outer races of the bearings 64 are pressed or otherwise secured in associated cylindrical counterbores 66,67 formed in a flanged, generally circular bushing 68. The cylindrical counterbores 66,67 are coaxial with each other and slightly eccentric to an outer cylindrical surface 69 of the main length of the bushing 68.

The flange, designated 71, of the bushing 68 is provided with a plurality of angularly spaced, circumferentially extending slots 72 in which are received threaded fastener bolts 73. The bolts 73 are threaded into associated holes in the tube support 24 and, when tightened, lock the bushing in a desired angular position in the bore of the tube support 24 receiving the bushing. The extended gear hub 59 is retained in the bearings 64 by a nut 70. The torsion rod 56 is fixed to the gear 61 as by welding at 74.

At its upper end, the torsion rod 56 is connected to the associated cutter roll 12 by means of a removable cup-shaped driver 75. The driver cup 75 has a central bore 78 in which is received the upper end of the torsion rod 56. The driver cup 75 is adjustably locked in angular position on the torsion rod 56 by tightening a threaded cross-bolt 79 (FIG. 1), which when tightened tends to draw the bore 78 tightly on the torsion rod 56. A radial slot 81 enables the bore 78 to constrict on the torsion rod 56 when the bolt 79 is tightened. The cup driver 75 is connected to the associated cutter roll 12 through an annular carrier 86. The cup 75 is removably secured to the carrier 86 by a plurality of threaded bolts 87. The carrier 86 is a precision-formed element that snugly fits over the outer race of the associated bearing 46 and is received in a precision-formed bore 88 of the cutter roll 12 with a precision fit. The cutter roll 12 is removably secured to the carrier 86 by circumferentially spaced bolts 89.

In accordance with the invention, the set of cutter rolls 11 and 12 are adjustable radially with respect to one another, the set of drive gear elements 41, 61 are adjustable radially with respect to one another, and such adjustment of either set is independent of adjustment of the other set. Further, the angular relationship between the cutter rolls 11 and 12 is adjustable by virtue of the selective position clamping function of the cup driver bore 78 on the torsion rod 56 independently of interengagement of the gears 41, 61. By way of explanation, the gear 41 and associated cutter roll 11 can be understood to rotate about a common axis identified with the axis 13 of the main shaft 28. This axis 13 is fixed with respect to the tube support 24. The rotational axis of the other cutter roll 12 is adjustable radially with respect to the first axis 13 by virtue of the eccentricity of the cylindrical pivot post surface 48 relative to the other cylindrical portion 50 of the pivot post 47 (defining the axis 14) received in the bushings 51,52.

By manually rotating the pivot post 47 with a pin received in a radial hole 76 at the upper end of the pivot post, the true center of the cutter roll 12 (revolving on center with the eccentric 48) is moved closer to or away from the mating cutter roll 11.

When the pivot post 47 has been manually rotated to an angular position yielding a desired radial setting (i.e., center-to-center distance) of the associated cutter roll 12 relative to the other cutter roll 11, the nut 58 is drawn tight on the tension tube 54 to lock against the top of the pivot post and maintain it in such position. The angular adjustment of the pivot post 47 with a pin inserted in the hole 76 may be accomplished before assembly of the drive cap or cup 75 on the torsion rod 56.

At the other end of the torsion rod 56, the drive gear element 61 is adjustably radially positioned with respect to the mating gear 41 by rotating the bushing 68 in the bore, designated 91, in which it is received in the tube support 24. The slots 72 are of sufficient circumferential length to allow for such angular positioning of the bushing 68. When the proper position of the bushing 68 has been obtained, the bolts 73 clamp the bushing against movement. Eccentricity between the counterbores 66,67 on the one hand and the bushing surface 69 results in radial displacement of the gear 61 relative to the mating gear 41 to a desired point where there is effectively zero backlash between these gears.

Figure 1:
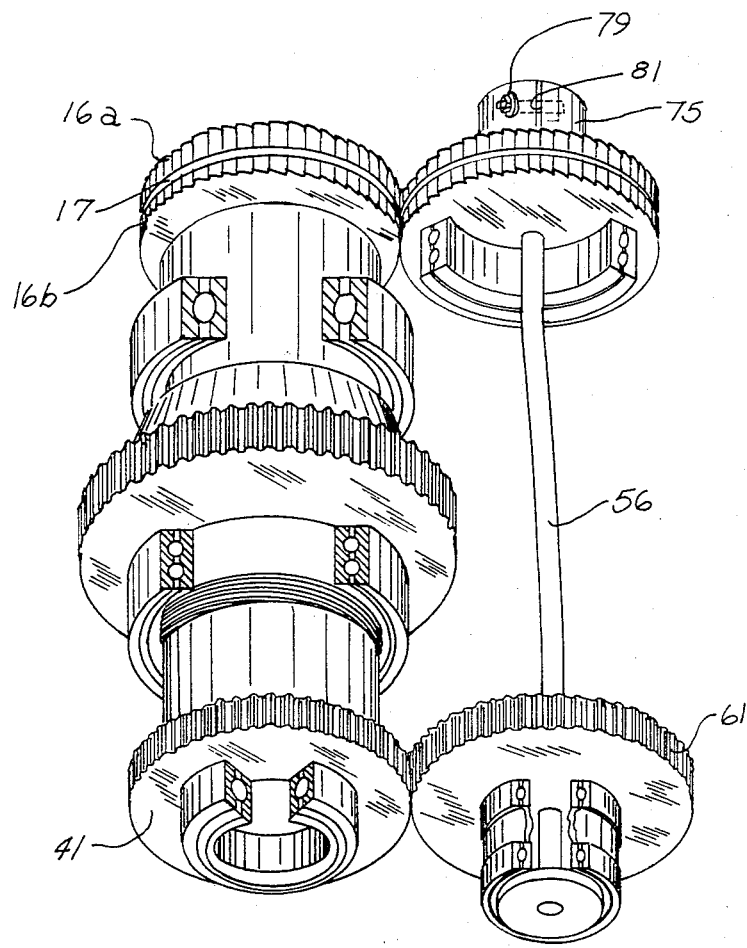
FIG. 1 is a diagrammatic, perspective view of a set of cutter roll spindles and associated gear drive elements arranged in accordance with the invention.

It is thus seen that the radial adjustment between the drive gear elements 41 and 61 is independent of the radial adjustment between the cutter rolls 11 and 12, and vice versa. FIG. 1 diagrammatically illustrates the relationship between the cutter roll sets 11,12 and gear drive element sets 41,61. In FIG. 1, the torsion rod 56, in a highly exaggerated manner, is shown to be laterally distorted from a straight line to accommodate rotation of the related cutter roll 12 and gear drive element 61 on parallel but radially offset axii. The torsion rod 56 is proportioned to have sufficient torsional rigidity to maintain a desired fixed angular relationship between the gear 61 and roll 12 (once the drive cap 75 has been clamped on the torsion rod 56 during operation of the apparatus 10).

At the same time, the resistance of the torsion rod 56 to lateral deflection or bending is low, so that such distortion of the rod is not accompanied by excessive stress or bearing loads. The double-roll ball bearing unit 46 associated with the cutter roll 12 has sufficient axial length and stability to prevent the cutter roll from tilting out of a plane perpendicular to the ideal axis 14. Similarly, the bearings 64 associated with the gear drive element 61 are of sufficient axial relative spacing and loading as to prevent the gear 61 from tilting out of a plane perpendicular to this ideal axis 14.

Figure 2:
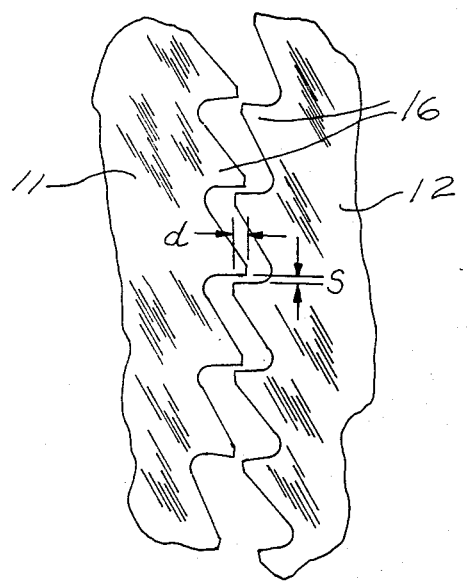
FIG. 2 is a schematic, fragmentary axial view of the cutter rolls.

Referring now to FIG. 2, there is shown in greatly enlarged scale the nip area of the cutter rolls 11 and 12. In this FIG. 2, the dimension labeled "s" represents the spacing measured in the circumferential or chordal sense between opposed, mutually cooperating teeth 16 of the rolls 11 and 12. The dimension labeled "d" represents the overlap or degree of intermeshing of the teeth 16 of the opposed rolls 11,12. The ideal settings for both the circumferential gap "s" and radial overlap "d" depend on numerous factors, including the gauge and type of material being slit by the rolls 11,12. In fact, in certain instances, it may be desirable to arrange the rolls 11 and 12 such that the dimension "s" is slightly negative, i.e., such that the teeth 16 of the rolls 11 and 12 contact one another with slight interference or preload.

It can be understood from the foregoing disclosure that the circumferential gap "s" existing between mutually cooperating cutting teeth 16 in the nip area is adjustably determined by the angular position at which the drive cap 75 is clamped on the torsion rod 56. This can be appreciated when it is understood that the gear drive elements 41 and 61 have first been adjusted radially with respect to one another, as discussed above, to a position where there is zero backlash between these elements. The degree of overlap "d" is adjustably determined when the apparatus 10 is being set up for a production run and the pivot post 47 is manually turned to take advantage of the eccentricity of the upper zone 48 of the pivot post encircled by the cutter roll 12, also as discussed above.

Where, as in FIG. 2, the circumferential gap between mutually cooperating teeth 16 is established as a positive clearance, relatively long cutter life may be expected, since during operation of the apparatus and counter-rotation of the cutter rolls 11 and 12, there is no direct contact between opposed teeth. The gap "s", however, can be quite small to permit processing of relatively light gauge foil stock.

Figure 5A:
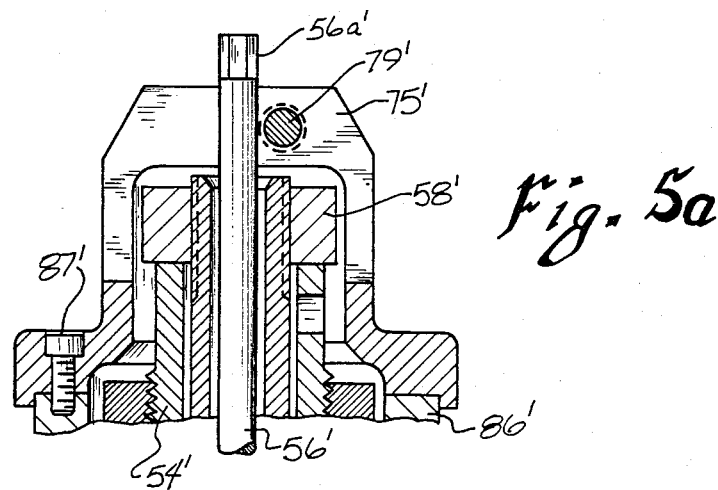
FIG. 5a is a fragmentary section of the upper end of the cutter drive illustrating a modified cutter drive structure which permits easy adjustment of the drive to preload the cutter teeth.
Figure 5B:
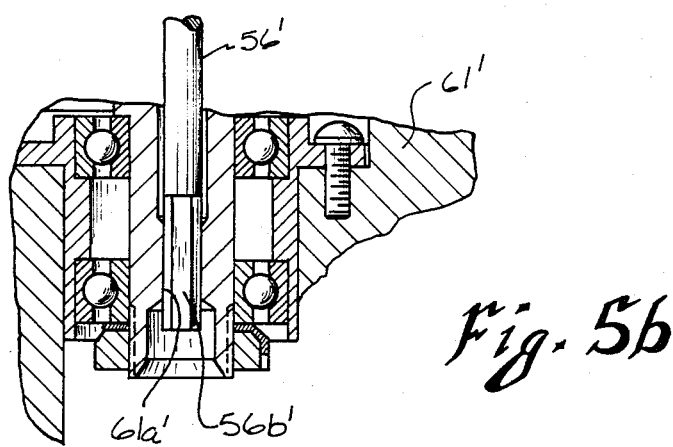
FIG. 5b is a fragmentary section of the lower end of the cutter drive illustrating a modified torsion rod connecting structure.

FIGS. 5a and 5b illustrate a modified drive structure which allows easy replacement of the torsion rod and easy adjustment of the associated cutter roll with respect to the torsion rod so as to preload the cutter teeth. In this modified embodiment similar reference numerals are used but a prime is added to indicate reference to the modified embodiment.

As mentioned above it is desirable in some instances to provide a small preload between the gear teeth. For example, when cutting very thin aluminum material having a thickness of about 0.004 inches to 0.005 inches, it is generally necessary to adjust the cutter so that there is no clearance "S" between the teeth. In fact, if the material is relatively ductile it is necessary in some instances to preload the teeth in the direction toward engagement so that the material being cut does not bend around the cutting edges so as to force the teeth apart with the result that cutting does not actually occur.

Further in instances where it is desired to cut very narrow spines, for example spines having a width of about 0.020 inches or less, from very thin material satisfactory cutting can be obtained in many instances only when the teeth are preloaded a small amount.

For such preloading the torsion bar 56' is provided with a projecting portion 56a' which extends above the cup drive. This projecting portion 56a' is formed with wrenching flats so that a suitable wrench can be put on the upper end of the torsion rod while the cup driver 75' is being adjusted.

When it is desired to provide a preload between the cutter teeth the cross bolt 79' is loosened to allow free relative rotation between the cup driver 75' and the upper end of the torsion rod 56'. A wrench is then placed on the projecting portion 56a' and torque is applied to produce a small twist or rotary strain in the torsion rod. Such torque is applied in the direction so that when the wrench torque is released the cutter teeth are biased into engagement. Then while such torque is being maintained by the wrench the cup driver 75' is rotated until the cutter teeth engage and the cross bolt 79' is tightened to lock the cup driver and torsion rod in their adjusted position. After the cup driver is locked in position the wrench torque is released and the twist or strain in the torsion 56' attempts to relieve itself but merely applies a torsion force to the cutter 12 which preloads the teeth of the two cutter rolls. If a greater amount of preload is required a greater torque is applied to the torsion rod 56' during adjustment and if a lower preload is required a lower torque is applied during the adjustment.

FIG. 5b illustrates a modified structure for mounting the lower end of the torsion rod 56' in the driven gear 61'. In this embodiment the bore of the driven gear 61' is formed with a precision polygonal opening 61a' and the lower end of the torsion rod 56' if formed with a mating polygonal extension 56b'. Preferably the opening 61a' and the projecting ends 56b' are formed with a slight taper so that when the torsion rod is installed a vertically downward force causes mating engagement with a locking tapor and zero clearance. On the other hand if it becomes necessary for any reason to remove and replace the torsion rod 56' a suitable tool can be positioned against the lower end of the torsion rod 56' and it can be driven with a hammer or the like to move the torsion rod 56' upward until it is free to be removed and replaced.

It has been found that with the present invention it is possible to cut or slit thinner material and to form spines having a smaller lateral width. For example, generally in the past the thinnest aluminum strip that has been capable of satisfactory cutting had a thickness of about 0.007 and the narrowest lateral width of spines which could be satisfactorily cut has been 0.030 inches wide. With the present invention it has been possible to obtain satisfactory sharing or slitting of stock having a thickness as low as 0.004 inches and spines having a lateral width of about 0.017 inches. Since the heat exchanger efficiency is improved for a given amount of spine fin material by reducing the lateral width of the spines greater efficiencies can be obtained by reducing the lateral width of the spines and substantial material savings can be obtained by reducing the thickness of the material forming the spines.

The present invention therefore makes it possible to reduce the material costs well improving efficiency.

The ability to independently adjust the center-to-center distances of the cutter rolls 11,12 and gear drive elements 41, 61 provided by the present invention has advantages in addition to making it possible to successfully process light gauge stock. For example, tolerances in the machining of the cutter rolls 11, 12 are not directly influenced by similar tolerances in the fabrication of the gear drive elements 41,61, and vice versa. Positional adjustments of a set of these elements to account for deviations from an ideal shape do not affect the condition of the other set of these elements.

The invention makes resharpening of the cutter rolls 11,12 quite practical. Where the circumference of the cutter rolls 11,12 is resurfaced during sharpening operations, the effective diameter of the rolls may be reduced. The disclosed apparatus 10 permits a new center-to-center distance to be established between the cutter rolls 11,12 in such case without affecting the center-to-center distance of the gear drive elements 41,61.

Although the preferred embodiments of this invention have been shown and described, it should be understood that various modifications and rearrangements of the parts may be resorted to without departing from the scope of the invention as disclosed and claimed herein.

What is claimed is:

1. Apparatus for transversely slitting a ribbon of sheet stock comprising a pair of cutter rolls forming a nip therebetween and each having peripheral cutting teeth adapted to cooperate with teeth on the other roll to cut slits at a cutting station formed at the nip, means for rotatively supporting said rolls for counter-rotation about spaced axes, means for adjustably fixing the center-to-center distance between said rolls to thereby achieve a desired radial spacing between opposed teeth, and positive drive means operatively interconnected between said rolls and arranged to maintain a desired circumferential orientation between opposed teeth passing through the nip during counter-rotation of the rolls, said positive drive means including means to permit center-to-center adjustment of said rolls independent of the circumferential orientation of opposed teeth in the nip, said drive means including a set of intermeshed gears each associated with one of said cutter rolls and each supported for rotation about an axis parallel to the axis of its associated roll, said gear supporting means at one of said gears including means to adjustably determine the center-to-center distance between said pair of gears, said drive means and gear supporting means being arranged to permit center-to-center adjustment of said pair of gears to be accomplished independent of the center-to-center spacing of said cutter rolls.

2. Apparatus as set forth in claim 1, wherein one roll and an associated gear are fixed in coaxial relation while the other roll and its associated gear are each arranged to be adjusted radially in relation to their respective roll and gear independently of the position of one another.

3. Apparatus as set forth in claim 2, wherein said adjustable roll and gear are interconnected by a radially compliant, torsional element which is substantially torsionally stiff.

4. Apparatus as set forth in claim 3, wherein said radially compliant, torsional element is a relatively slender shaft.

5. An apparatus as set forth in claim 4 wherein said torsional element is provided with a connection at one end including a noncircular tapered portion which extends into a mating opening to provide a zero clearance connection which can be disassembled.

6. An apparatus as set forth in claim 4 wherein adjustment means are provided to apply torsional stress to said torsional element to preload said rolls in a direction of tooth engagement.

7. An apparatus as set forth in claim 6 wherein said adjustment means for applying torsional stress include means to apply torque to said torsional element and to lock the associated roll to said torsional element while said torsional stress is applied thereto.

8. Apparatus as set forth in claim 1, including means to adjustably fix the angular orientation of one of said rolls relative to its associated drive gear.

9. An apparatus for transversely slitting a ribbon of sheet stock comprising a pair of cutter rolls forming a nip therebetween and each having peripheral cutting teeth adapted to cooperate with the teeth on the other roll to cut slits at a cutting station formed at said nip, gear drive means interconnecting said rolls for counter rotation, the connection between at least one gear and its associated roll providing adjustable spring means for biasing said rolls in a direction tending to maintain engagement between said teeth with a preload which is determined by the adjustment of said spring means.

10. An apparatus as set forth in claim 9, wherein said means for biasing said rolls includes a torsional spring and means to adjust the torsion applied thereby to said rolls.

11. An apparatus as set forth in claim 10, wherein said torsion spring is an elongated rod connected between at least one of said rolls and the associated of said gears, said one of said rolls being journaled for rotation about an axis spaced from the axis of rotation of said associated gear, said torsional spring being sufficiently laterally flexible to provide a driving connection between said spaced axes.

12. An apparatus as set forth in claim 11, wherein the axis of rotation of said one roll is adjustable with respect to the axis of rotation of the other roll, and the axis of rotation of said associated gear is independently adjustable with respect to the axis of rotation of the other gear.

13. Apparatus for transversely slitting a ribbon of foil stock or the like comprising a first toothed cutter roll and a first drive gear, means supporting said first cutter roll and first drive gear for rotation about a fixed common axis, positive drive means connecting said first cutter roll and first drive gear for the same angular rotation, a second cutter roll and a second drive gear, means supporting said second cutter and second drive gear for rotation about respective axes which are each parallel to said fixed axis, with said second cutter roll in opposition to said first cutter roll and said second drive gear meshed with said first drive gear, positive drive means connecting said second cutter roll and said second drive gear for the same angular rotation, said second cutter roll supporting means including means to adjustably position said second cutter roll radially with respect to said first cutter roll independently of the position of said second drive gear, said second gear supporting means including means to adjustably position said second drive gear radially with respect to said first drive gear independently of the position of said second cutter roll.

14. Apparatus as set forth in claim 13, including means to adjustably fix the angular position of one of said cutter rolls relative to its associated drive gear.

15. Apparatus for transversely slitting a ribbon of sheet stock comprising a pair of cutter rolls forming a nip therebetween and each having peripheral cutting teeth adapted to cooperate with teeth on the other roll to cut slits at a cutting station formed at the nip, means for rotatively supporting said rolls for counter-rotation about spaced axes, positive drive means including a set of intermeshed gears each connected to the associated cutter roll with non-clearance connections by a solid shaft and arranged to maintain a desired circumferential spacing between opposed teeth passing through the nip during counter-rotation of the rolls, the improvement comprising means for adjustably supporting said cutter rolls in a manner which permits the center-to-center relation of the cutter rolls to be adjusted without affecting the spacing between said intermeshed gears.

16. An apparatus as set forth in claim 15, wherein at least one of said solid shafts is laterally deflectable to permit said adjustment of said center-to-center relation of said cutter rolls.

17. An apparatus as set forth in claim 15, wherein at least one of said solid shafts is torsionally resilient and connected to apply a resilient force biasing said cutting teeth into engagement.

* * * * *